July 25, 1967            A. M. HAND            3,332,661

FREIGHT CONTAINER WITH RETRACTABLE LEGS

Filed Dec. 27, 1965

INVENTOR
ALBERT M. HAND
by

*Leon Arthurs*

Agent

United States Patent Office 3,332,661
Patented July 25, 1967

3,332,661
FREIGHT CONTAINER WITH RETRACTABLE LEGS
Albert M. Hand, Etobicoke, Ontario, Canada, assignor to Steadman Industries Limited, Cooksville, Ontario, Canada
Filed Dec. 27, 1965, Ser. No. 516,377
5 Claims. (Cl. 254—86)

ABSTRACT OF THE DISCLOSURE

Each retractable leg of the invention is comprised of an appendage slidably engaged in a bearing integrated with the base of the container and an hydraulic cylinder connected by one of its ends to the outer end of the appendage; said connection being pivotal permitting linear alignment of said cylinder and appendage for storage in said bearing or angular alignment thereof with the cylinder extending above the container base and the piston rod of the cylinder pointing downwardly.

---

The present invention relates to freight containers and supporting legs therefor, and has particular reference to freight containers which may be carried demountably on vehicles such as trucks, trailers and the like.

The term freight container as used herein denotes a relatively massive, boxlike structure used for holding the entire payload of a vehicle or at least a substantial proportion thereof. Such a container may, in effect, constitute the freight containing body of a vehicle, and the vehicle may be unloaded simply by removal of the entire freight container, and its contents, from the vehicle. Of course, a single vehicle may have mounted thereon any one of a plurality of freight containers, so that as soon as one container has been demounted therefrom the vehicle may immediately be equipped with another which has previously been loaded with freight. In this way the versatility of the vehicle is greatly enhanced and the vehicle need not stand idle during the operations of loading and unloading.

The practice of supporting freight containers by means of legs when they are demounted from a vehicle is not in itself new. Legs have previously been attached to containers at the corners thereof and the major or vertical portion of each leg was, if necessary, spaced somewhat outwardly of the container to permit a vehicle chassis to be driven between the legs in transit under or away from the container without disturbing the legs.

It has been found desirable in some instances to have the legs transported with the container so that they can quickly and readily be utilized at any location to which the container may be taken. Conversely, for obvious reasons, it is undesirable to have any lateral projections on a freight container while it is being transported.

The invention accordingly has for a broad object the provision of an improved freight container and legs therefor which are compactly stowable on said container when not in use.

On the other hand, because of the loads which they have had to bear container legs often have to be quite substantial and hence relatively bulky which necessitates careful attention to the storage of legs carried with the container so as to avoid encroachment on freight capacity or payload space.

It is, therefore, a related object of the invention to provide a freight container with storable legs and facilities for storing them, which occupy a minimum of space and do not substantially diminish the freight capacity of the container.

It is a further object of the invention to provide a freight container with legs which are disposed laterally of the container in use and which are foldable and storable, when not in use, in compartments in the container in which they are wholly contained so as not to project laterally of the container and wherein they are readily accessible from the container sides.

It is a further object of the invention to provide the combination of a freight container with legs foldable and storable as aforesaid wherein said legs also constitute jacks for raising and lowering the container when supported thereby.

It is a further object of the invention to provide a combination as aforesaid wherein said container can be lowered and raised by means of said legs to and from ground level.

It is a further object of the invention to provide a combination as aforesaid wherein said legs, when not in use, are inconspicuously housed and largely protected from the weather and deleterious matter which may be thrown up from a highway along which said container is being transported.

It is a further object of the invention to provide, in a freight container, recesses which function in the dual capacity of bearings for container legs when the latter are in use and storage compartments for the said legs when the are not in use.

It is a still further object of the invention to provide an improved freight container and legs combination which is of rugged yet simple construction, easy to operate and durable in use.

The foregoing and other objects are achieved in accordance with the invention by the provision of a freight container and legs therefor wherein each leg is foldable to permit storage thereof on the container. To permit such folding each leg comprises a standard and an appendage articulated therewith in the manner of a knee or a foot and said articulated parts are movable between a so-called "aligned" attitude wherein the standard and the appendage are linearly aligned for storage and a load-bearing attitude wherein the appendage is fixed to project radially from the standard for transmitting a load thereto. Each leg is fixable in the load-bearing attitude by bracing which may extend between the standard and the appendage. The container is supported through bearings therein, each bearing including a passageway in which a said appendage is engageable in the braced, load-bearing attitude of the leg. When not in use the legs may be unbraced and moved to the aligned attitude in which they are storable in the bearing passageways. The bearings and their passageways are oriented to be accessible from the container sides whether for storing the legs therein or for removing the legs therefrom.

Further features, objects and advantages of the invention will manifest themselves in the ensuing description of exemplary embodiments thereof illustrated in the accompanying drawings wherein:

FIG. 1 shows a freight container 2 equipped with legs 4 in accordance with the invention. For illustrative purposes the three legs which are visible in the figure have been shown in different attitudes, but it will be understood that all of them can be disposed in the same attitude.

Figure 1:
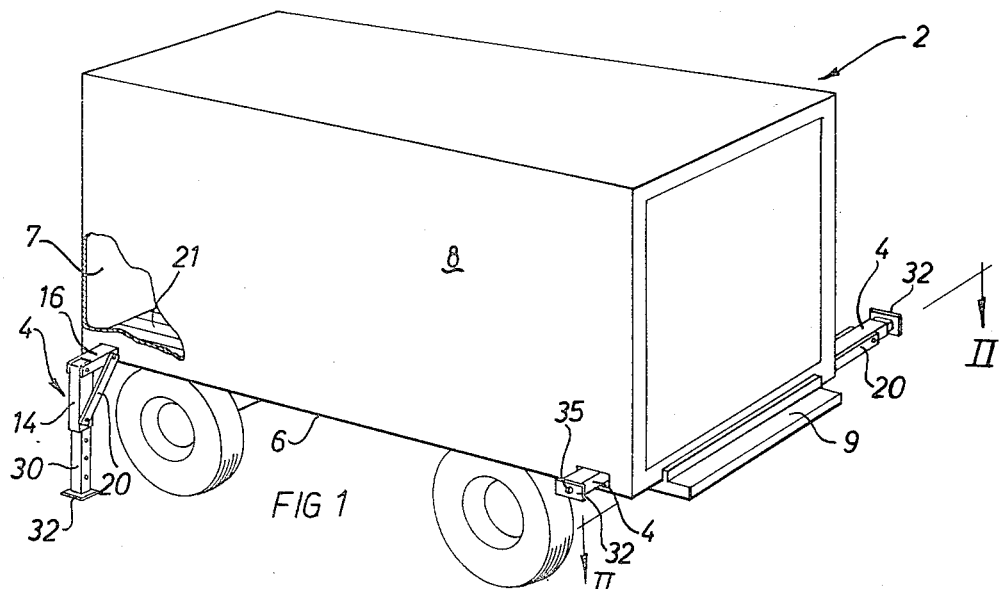
FIG. 1 is a perspective view of a freight container mounted on a trailer, supporting legs in accordance with the invention being shown in various attitudes on said container.

The container 2 includes a base 6 which may be generally rectangular in plan, as is conventional, and the container further includes a hollow freight chamber 7 defined, in part, by walls 8. It is contemplated that for transportation purposes the container 2 will be demountably mounted on a vehicle such as a trailer 9; the legs 4 serving to support the container 2 when the latter is demounted from the vehicle.

The container 2 is provided with a bearing 10 at each corner thereof in this example, by which it can be supported at an elevation above the ground. That is to say the bearings 10 are integrated with the basic container structure so that the container 2 is quite adequately and firmly supportable on suitable legs engaged in such bearings. Each of the bearings 10 has a passageway 12 therein for a purpose which will shortly be apparent.

Each of the container legs 4 includes a standard 14 and an appendage 16 articulated therewith. In the FIG. 3 embodiment the appendage 16 is pivoted at 18 to the standard 14. By reason of the articulation between the standard 14 and the appendage 16 the leg 4 can be moved between an attitude in which the standard and appendage are disposed in linear alignment with each other, shown at the right-hand side of FIG. 1 and herein termed the aligned attitude, and a load-bearing attitude in which the appendage 16 projects radially from the standard 14 as shown at the left-hand side of FIG. 1 and in FIG. 3.

In accordance with the invention, bracing 20 is provided for releasably fixing the leg 4 in its load-bearing attitude with the appendage 16 projecting horizontally from the vertically positioned standard 14, as will be explained in greater detail hereinafter.

The appendage 16 in the load-bearing attitude of the leg is engageable in bearing 10 whereby the standard is disposed in a more or less upright position at the side of the container 2. As shown at the left-hand side of FIG. 1 the standard 14, in this attitude of the leg 4, may be spaced somewhat laterally of the container 2 to permit passage of the wheels of the trailer 9 when the latter is moved to and from its illustrated position, the parts being pursuantly dimensioned and placed. Obviously when the container 2 is supported on leg 4 its weight is transmitted through the bearing 10 and appendage 16 to the standard 14.

Figure 2:
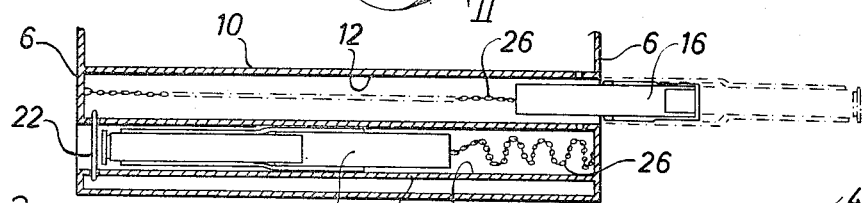
FIG. 2 is a section on the line 11—11 of FIG. 1 but showing one leg in a load-bearing attitude and another leg in a stored position.
Figure 4:
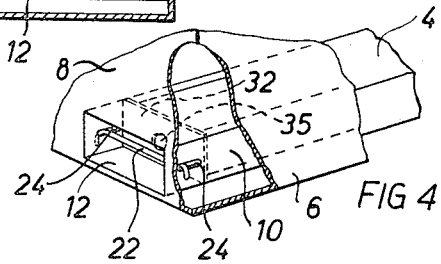
FIG. 4 is an enlarged, fragmentary view of one corner of the container illustrated in FIG. 1 showing a leg in stored position within a bearing on the container.

Conversely, when the leg 4 is in its aligned attitude the complete leg 4 is receivable and storable in the bearing passageway 12 as illustrated in FIGS. 2 and 4; the standard 14 and the appendage 16 being then disposed in linear alignment with each other.

Figure 3:
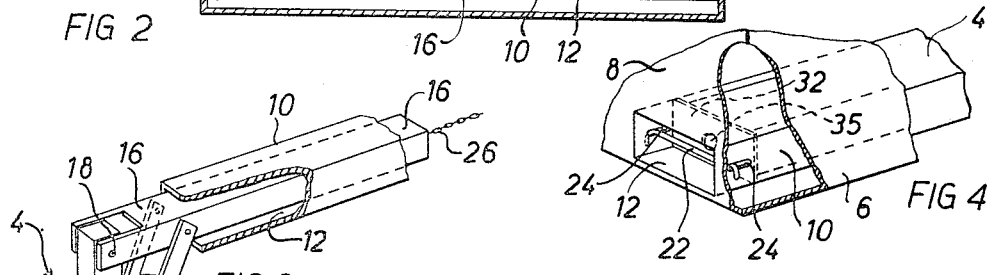
FIG. 3 is a perspective view of a container leg in load-bearing attitude, a fragment of a bearing in which said leg is mountable being also shown.
Figure 5:
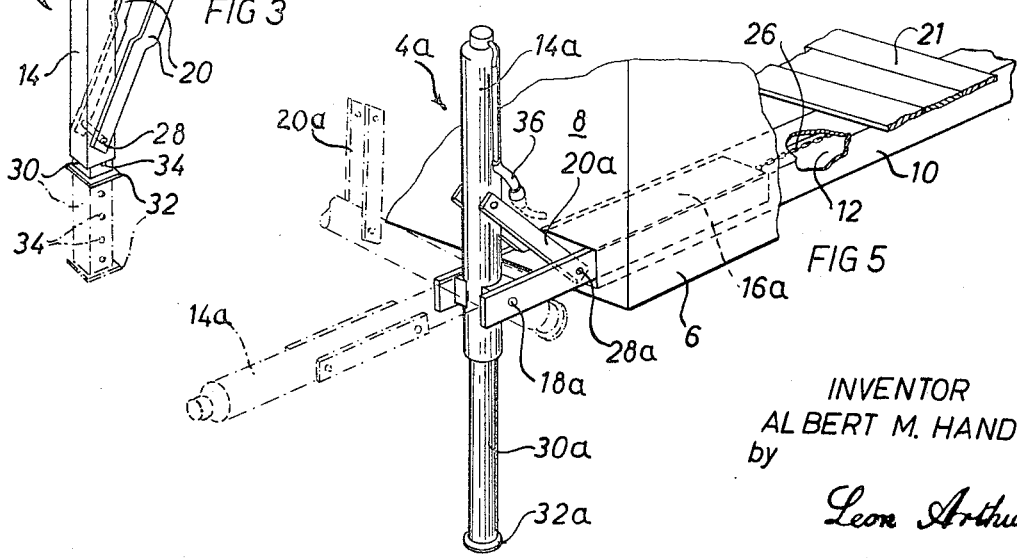
FIG. 5 is a fragmentary view generally corresponding to FIG. 4 but showing an alternative form of leg in load-bearing attitude and also showing a portion of the flooring of the container.

The structure of the bearings 10 is shown in FIGS. 2, 3 and 5, and it will be understood that, as the bearings 10 are preferably of identical construction, a description of one such bearing will suffice for the present purposes. The bearing 10 of FIG. 3 is, in effect, a metal tube which forms an integral part of the container base 6 and may in fact, be a structural member of the base. The tube or bearing 10 is open at one end, at least, and may be elongated in the direction of the width of the container 2 to extend completely across the base 6—i.e., from one side to the other of the container 2. The open end of the bearing 10, which constitutes the entrance to the passageway 12, is disposed adjacent one side of the container 2.

Although the whole construction of the container base 6 is not a feature of the present invention, it will be understood that in accordance with conventional practice the base may include interconnected longitudinal-members and cross-members and the bearings 10 may constitute some, at least, of said members.

Since the bearings 10 form an integral part of the container base 6 they need not protrude into the freight chamber 7 and diminish its capacity. The flat floor 21 of the chamber 7 immediately above a bearing 10 can be seen in FIGS. 1 and 5. It will also be observed that the enclosed nature of the bearings affords the legs 4 temporarily stored therein considerable protection against moisture and other corrosive agents. When stored within the bearings 10, moreover, the legs 4 are relatively inconspicuous so that externally the container 2 may appear little different from hitherto known containers of the same type.

Preferably the bearing 10 has a non-circular cross-section and the leg appendage 16 has a matching cross-section whereby rotation of the appendage in the bearing when the leg is in use is inhibited.

Attention is now directed to FIG. 2 which shows a leg 4 in aligned attitude stored in a bearing 10 with the appendage 16 of another leg 4 engaged in an adjacent bearing 10 in the load-bearing attitude of that leg 4. It will be observed that the leg 4 disposed in the aligned attitude in this view may well have a total length which is greater than one half the width of the container 2. In such case the bearings 10—10 accommodating legs 4—4 on opposite sides of the container 2 may be mutually offset in the direction of the length of the container 2 as illustrated, whereby when both legs are stored in both bearings 10—10 the inner ends thereof can freely overlap permitting the outer ends thereof to lie more or less flush with the container sides, or at any rate not to project beyond said sides. In the present embodiment the container 2 includes a pair of bearings 10 adjacent each end thereof, the bearings 10 at the left-hand side of FIG. 1 being disposed in similar positions relative to each other as those at the right-hand side thereof which are also shown in the sectional view of FIG. 2.

Each bearing 10 may have associated therewith a retainer 22 which closes off the mouth of the passageway 12 therein and prevents a leg 4 temporarily stored in said passageway from emerging therefrom.

In the present embodiment the retainer 22 comprises a metal bar with angled ends as shown in FIG. 4. The angled ends of the retainer bar are releasably engageable in elongated slots 24 in the bearing 10 to dispose the main portion of the bar across the passageway 12 and constitute a barrier preventing egress of the leg 4 therefrom. The retainer 22 is manually removable from the bearing 12 when it is desired to use the leg 4 stored therein and, to prevent loss, may be attached to the container 2 by a short length of chain, although for clarity such chain has been omitted from the drawings.

As has been mentioned previously the invention contemplates that the container 2 and legs 4 shall be associated at all times and that the legs 4 shall travel with the container when the latter is transported by a vehicle. In view of this, provision may be made for permanently attaching the legs 4 to the container and this may be effected by means of flexible couplings, such as chains 26, which permit withdrawal of the appendages 16 from the bearings 10 sufficient only for standing the legs 4 in load-bearing attitude; further withdrawal of said appendages 16 being prevented.

As shown best in FIG. 2 a chain 26 is attached by one end to each appendage 16 and by the other to a fixed point on the container base 6 at the side of said base remote from the side from which the particular leg 4 is accessible. The chain 26 extends within the passageway 12 and is disposed slackly thereon when the leg 4 is stored as shown at the lower side of FIG. 2. Conversely when the leg 4 is in use the chain may be drawn taut as indicated at the upper side of that figure and the chain may be conveniently used to gauge the required amount of withdrawal of the appendage 16 from the bearing 10— that is to say the appendage may be arranged to be withdrawn therefrom to an extent which is limited by the chain 26.

It is now appropriate to consider the structure of the leg 4 in more detail. As noted heretofore, the leg includes a standard 14 and appendage 16 articulated therewith, the latter being preferably cross-sectionally mated with the passageway 12 to prevent its rotation therein.

The bracing 20 may be in the form of a pair of struts, as shown, pivotally attached to the appendage 16 at opposite sides thereof and, in the load-bearing attitude of the leg, connectible to the standard 14 by means of a removable pin 28 passing through registering holes in said links and standard. As shown in FIG. 3 when the bracing 20 is connected to the standard 14 as aforesaid the leg 4 is then fixed in its load-bearing attitude wherein the appendage 16 is angularly disposed relative to the standard and projects radially therefrom. In the aligned attitude of the leg 4 the struts of bracing 20 may lie alongside the aligned standard 14 and appendage 16 as shown at the right-hand side of FIG. 1 and in FIG. 2. Obviously in this instance sufficient clearance is left between the appendage 16 and standard 14 and the bearing 10 to accommodate the leg 4 when in this position.

The standard 14 may be tubular as illustrated and may have telescoped therewith a leg extension 30 including a ground-engaging foot 32. In the load-bearing attitude of the leg 4 the extension 30 depends from the standard 14 for engagement with the ground by its foot 32.

The extension 30 is preferably adjustable relative to the standard and interlockable therewith in a plurality of different longitudinal positions relative thereto, whereby the container 2 may be supported by the legs 4 at a plurality of different levels above the ground. In the FIG. 3 embodiment the extension 30 is locked in a selected position at the same time as the leg 4 is fixed in its load-bearing attitude by the bracing 20. That is to say one of the holes 34 in the extension is brought into registration with the holes in the standard 14 and thereafter the pin 28 is passed through the registering holes as well as through the holes in the bracing 20 as previously described. The extension 30 is shown in full line in FIG. 3 retracted almost wholly within the standard 14 while the chain dotted line showing of the same figure indicates a projected position of the extension. In some cases it may be necessary to move the extension to its fully retracted position within the standard before the leg 4 can be completely stored in the bearing 10.

When it is desired to move the leg 4 from its load-bearing attitude of FIG. 3 to its aligned attitude, the bracing 20 is disconnected from the standard 14 and the latter is swung upwards and outwards away from the container 2 until it is aligned with the appendage 16 as shown, for instance, at the right-hand side (rear) of FIG. 1. The struts comprising the bracing 20 are located alongside the standard 14 and the appendage 16, and the leg is then pushed completely into the passageway 12 of the bearing 10, a leg 4 partly pushed into a passageway 12 being shown at the right-hand side (front) of FIG. 1.

To facilitate withdrawal of the leg 4 from the bearing passageway 12, the foot 32 may be provided with an aperture 35 as shown in FIG. 4.

A container leg 4a, of modified form, is illustrated in FIG. 5 in load-bearing attitude with an appendage 16a forming part thereof engaged in a container bearing 10. The leg 4a is constructed to operate not only as a support for maintaining the container 2 at selected levels, but also as a jack for raising and lowering the container.

For this purpose the leg 4a includes a standard 14a with which the appendage 16a is articulated, the standard 14a being a hydraulic cylinder couplable by quick-release connections such as the connection 36 illustrated, to a source of hydraulic power. The appendage 16a is generally similar to the appendage 16 and serves, in the same manner, to transmit the load of the container 2 to the standard 14a to which it is pivoted at 18a. Bracing 20a is provided for fixing the leg 4a in its illustrated load-bearing attitude and may comprise struts pivoted at opposite sides to the standard 14a and connectible to the appendage 16a by means of a removable pin 28a passing through registering holes in the struts and the appendage.

An extension of the leg 4a in the form of a piston rod 30a carries a ground-engaging foot 32a and is telescoped within the standard 14a, the piston rod 30a being shown projected from the standard 14a in FIG. 5.

The position assumed by the standard 14a in the aligned attitude of the leg 4a before the latter is stored within the bearing 10 is shown in chain-dotted line in FIG. 5 as well as an intermediate position assumed by said standard as it is moved between its load-bearing and aligned positions. In the latter position it will be noted that the piston rod 30a is shown fully retracted.

The mode of operation of the leg 4a to raise and lower the container 2 in co-operation with other similar legs will be obvious, the piston rod being projectable and retractable relative to the standard 14a under hydraulic power and control. It is noteworthy, however, that in the load-bearing attitude of the leg 4a the major part of the standard 14a is disposed above the appendage 16a with the result that when the piston rod 30a is fully retracted therewithin the foot 32a is located at a level closely adjacent to, if not exactly coinciding with, the level of the underside of the container base 6. By virtue of this arrangement the container can be lowered to ground level at which its base 6 may even rest upon the ground—or at least upon wooden blocks themselves resting on the ground—when the piston rod 30a is fully retracted. It will be clear, however, that when the piston rod 30a is projected from the standard 14a the foot 32a will be moved to a position spaced below the level of the base 6 and that the container 2 can be thereby raised off the ground.

To move the leg 4a from its load-bearing to its aligned attitude the piston rod 30a is fully retracted, the bracing 20 is disconnected from the appendage 16a and the upper portion of the standard 14a is swung downwards and outwards away from the container 2 to the horizontal chain dotted line position of FIG. 5. In this embodiment the bracing 20 when disconnected must be pivoted to lie flatly against the sides of the standard 14a. The leg 4a is then pushed into the passageway 12 of the bearing 10 for storage therein in substantially the same manner as the leg 4. The leg 4a may be coupled to the base 6 by a chain 26 in the same way as the leg 4, and may, of course, be retained within the passageway 12 by a retainer 22.

It will be apparent that the legs 4 or 4a can readily be carried with the container 2 when the latter is transported, and when stored in the bearings 10 do not protrude in an objectionable manner on the exterior of the container. Moreover the legs are at all times readily accessible at the sides of the container and can quickly be withdrawn from the bearings 10 and erected in their load-bearing attitudes when it is desired to support the container thereby.

Although the invention has been particularly described with reference to the embodiments thereof shown in the accompanying drawings it should be understood that said embodiments have been described for illustrative purposes only and that many changes and modifications in said embodiments will suggest themselves to persons skilled in the art to which the invention relates, all such embodiments falling within the scope of the claims now following.

What I claim is:

1. In combination:
   a freight container including a base forming the bottom of the container;
   legs for said container each comprising an hydraulic cylinder and an appendage articulated together by respective ends thereof for movement between a storage attitude in which said cylinder and appendage are linearly aligned and another, load-bearing, attitude in which said appendage projects radially from said cylinder for transmitting a load thereto;

a piston rod inside the cylinder projectable and retractable through the end of the cylinder articulated with said appendage;

bearings by which said container is supportable integrated with said base, each said bearing having a passageway accommodating a said appendage in the load-bearing attitude of the leg and providing temporary storage for said leg in its aligned attitude, each said bearing being disposed to render said legs temporarily stored therein accessible from the side of the container, and bracing for releasably fixing said leg in said load-bearing attitude with the cylinder extending above said base and with its articulated end lowermost and the said piston rod pointing downwardly.

2. The combination as claimed in claim 1 wherein:

each said leg in its said aligned attitude has a length greater than half the width of said container, and a pair of said bearings is located adjacent each end of said container;

said bearings of each said pair being disposed to render said legs, when temporarily stored therein, accessible from opposite sides of said container and being mutually offset in the direction of the length of said container permitting simultaneous storage of a pair of said legs therein.

3. The combination as claimed in claim 1 wherein:

each said leg is attached by a flexible coupling to said container preventing complete withdrawal of said appendage from said bearing.

4. The combination as claimed in claim 1 wherein:

each said bearing comprises an elongated tubular member defining said passageway and open at one end, at least;

said tubular member extending in the direction of the width of said container and having said open end disposed adjacent a side of the container.

5. The combination as claimed in claim 1 and further comprising:

a retainer associated with each of said bearings;

said retainer being installable to bar the opening of the bearing to retain a said leg within said passageway when stored therein.

References Cited

UNITED STATES PATENTS

| | | | |
|---|---|---|---|
| 1,852,436 | 4/1932 | Robinson | 212—145 X |
| 2,777,586 | 1/1957 | Boysen et al. | 212—145 |
| 2,958,538 | 11/1960 | Norris et al. | 280—150.5 |
| 3,063,667 | 11/1960 | Doty et al. | 248—150 |

OTHELL M. SIMPSON, *Primary Examiner.*